United States Patent Office 3,162,648
Patented Dec. 22, 1964

3,162,648
ALPHA-METHYL-ALPHA-PHENYL
BETA-ETHYLSUCCINIMIDE
Charles A. Miller, Detroit, Mich., assignor to Parke, Davis & Company, Detroit, Mich., a corporation of Michigan
No Drawing. Filed Mar. 9, 1962, Ser. No. 178,565
1 Claim. (Cl. 260—326.5)

This invention relates to succinimide compounds. More particularly the invention relates to α-methyl-α-phenyl-β-ethylsuccinimide compounds of the formula

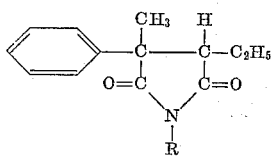

to methods for their production and to their pharmaceutical applications; where R represents hydrogen or methyl.

In accordance with the invention, compounds of the foregoing formula can be produced by heating α-methyl-α-phenyl-β-ethylsuccinic acid or a reactive derivative thereof with a compound of the formula $$RNH_2$$

where R is as defined before. Some examples of suitable reactive derivatives of α-methyl-α-phenyl-β-ethylsuccinic acid are the anhydride and the acid halides. The reaction of α-methyl-α-phenyl-β-ethylsuccinic acid and its reactive derivatives with ammonia or methylamine can follow a stepwise course in which an intermediate reaction product is formed and then undergoes further reaction to give the desired α-methyl-α-phenyl-β-ethylsuccinimide compound upon heating at temperatures substantially in excess of room temperature. When α-methyl-α-phenyl-β-ethylsuccinic acid is employed as a starting material, the intermediate reaction product is a salt of the acid and ammonia or methylamine. Upon heating this salt, preferably at about 150–250° C., it undergoes dehydration and ring closure to yield the desired succinimide. When α-methyl-α-phenyl-β-ethylsuccinic anhydride is used as a starting material, the intermediate reaction product is a half amide, that is, a substituted succinamic acid or a salt thereof. Upon heating, preferably in the presence of a dehydrating agent such as acetyl chloride or acetic anhydride, the half amide undergoes dehydration and ring closure to yield the desired succinimide. When α-methyl-α-phenyl-β-ethylsuccinyl halide is used as a starting material, the intermediate reaction product is a diamide or a mixed amide-acid halide, that is, a substituted succinamyl halide. Upon heating, these products undergo ring closure to yield the desired succinimide. The foregoing intermediate reaction products are other examples of reactive derivatives of a α-methyl-α-phenyl-β-ethylsuccinic acid suitable for use in the process of the invention.

The reaction of α-methyl-α-phenyl-β-ethylsuccinic acid or a reactive derivative thereof is carried out with at least one equivalent and preferably an excess of methylamine or ammonia. In those cases where an acid halide is employed as the reactive derivative, it is preferable to use at least three equivalents of methylamine or ammonia. If desired, any of a variety of unreactive solvents can be present although in the case of α-methyl-α-phenyl-β-ethylsuccinic acid, the process is normally carried out by first reacting this acid with aqueous ammonia or aqueous methylamine followed by heating the mixture until volatile components including water are removed.

The compounds of the invention can exist in diastereoisomeric forms. By fractional crystallization and resolution procedures, the individual diastereoisomers as well as the optically active components can be obtained if desired.

The α-methyl-α-phenyl-β-ethylsuccinic acid and its reactive derivatives can be prepared by reacting a lower alkyl ester of α-cyano-β-methylcinnamate with potassium cyanide and ethyl bromide to form a lower alkyl ester of α,β-dicyano-α-ethyl-β-methylphenylpropionate which is then hydrolyzed and decarboxylated by heating with aqueous sulfuric-acetic acid to give α-methyl-α-phenyl-β-ethylsuccinic acid. This acid can be converted to reactive derivatives such as the anhydride or the halides by general procedures already known.

The compounds of the invention have useful pharmacological properties and are of particular value as tranquilizing agents. Their value as tranquilizing agents is associated with a favorable ratio of anticonvulsant activity to hypnotic activity. They have a comparatively high anticonvulsant activity as determined by their ability to prevent the occurrence of convulsions which normally follow the administration of pentamethylenetetrazole, in conjunction with a comparatively low hypnotic activity. They do not cause the more pronounced central nervous system depression of potent hypnotic agents. An additional advantage of these compounds is that they are effective upon oral administration.

Therapeutic compositions of the compounds of the invention are obtained by providing α-methyl-α-phenyl-β-ethylsuccinimide and N-methyl-α-methyl-α-phenyl-β-ethylsuccinimide in dosage unit form in pharmaceutical carriers or diluents. Dosage unit forms for oral administration are particularly suitable and for this purpose the active ingredient can be incorporated into tablets, powders, capsules, solutions, suspensions and similar forms with pharmaceutically-acceptable solid or liquid carriers or diluents.

The compounds of the invention are employed as tranquilizing agents by administering a total daily oral dose of about 0.2 to 5.0 g., optionally in divided portions. The dose is adjusted by first administering a comparatively small quantity and then increasing it as the response is evaluated; the usual total daily oral dose for maintenance is about 0.5 to 2.0 g.

The invention is illustrated by the following examples.

Example 1

A mixture of 80 g. of α-methyl-α-phenyl-β-ethylsuccinic acid and 200 ml. of concentrated aqueous ammonia is heated in an open vessel until the internal temperature reaches 210° C. and then maintained at this temperature for 15–30 minutes at which time distillation has ceased. After cooling the residue is dissolved in ether and the solution is filtered and evaporated. The product, α-methyl-α-phenyl-β-ethylsuccinimide, is distilled in vacuo; B.P. 190–200° C./5 mm. For further purification the distillate is dissolved in 50 ml. of methanol and the solution is diluted with water to the point of cloudiness and allowed to stand. The white solid which separates is collected on a filter and dried. If further purification is desired, 20 g. of this product is dissolved in 70 ml. of hot toluene. The solution is chilled and the crystalline product collected and dried first in air and then in vacuo at 55° C.; M.P. 65–66.5° C., mixture of diastereoisomers. The individual diastereoisomers are obtained by fractional crystallization from cyclohexane and from toluene; M.P. 119–120° C. and 61–63° C.

The starting material can be obtained as follows. 70 g. of potassium cyanide is added in one portion to 215 g. of ethyl α-cyano-β-methylcinnamate in 500 ml. of absolute ethanol. The mixture is heated under reflux for one hour, cooled to about 40° C. and then treated with 130 g. of ethyl bromide added in one portion. The solution is heated under reflux for six hours, cooled to 25–30° C. and filtered. The filtrate is combined with a 50 ml. washing of hot ethanol, diluted with water to the point of cloudiness and cooled. The insoluble product, ethyl α,β-dicyano-α-ethyl-β-methyl-phenylpropionate, is collected on a filter. This product is added in one portion to a solution of 700 g. of sulfuric acid, 300 g. of water and 200 g. of glacial acetic acid. The mixture is heated under reflux for twenty hours and cooled. The aqueous phase is removed by decantation and 450 ml. of aqueous sodium hydroxide containing 100 g. of sodium hydroxide is added to the residual viscous oil. This mixture is heated under reflux for three hours, cooled, acidified carefully to pH 6, chilled and filtered. The filtrate is acidified to pH 1 and allowed to stand for two days or until the insoluble product has solidified. This product, α-methyl-α-phenyl-β-ethylsuccinic acid, is collected on a filter and dried.

*Example 2*

With continuous stirring 236 g. of α-methyl-α-phenyl-β-ethylsuccinic acid is added to 231 g. of 40% aqueous methylamine. While stirring is continued, the mixture is gradually heated to 200° C. The distillate is discarded. The residue consisting of crude N-methyl-α-methyl-α-phenyl-β-ethylsuccinimide is fractionated by distillation in vacuo. The principal fraction is collected at a boiling point of about 174–180° C./3.0–3.75 mm. and is the desired product. If further purification is desired, it can be redistilled in vacuo; colorless liquid, B.P. 129° C./0.13 mm.

The same product is obtained by the substitution of 218 g. of α-methyl-α-phenyl-β-ethylsuccinic anhydride (prepared by heating α-methyl-α-phenyl-β-ethylsuccinic acid with acetyl chloride) for the α-methyl-α-phenyl-β-ethylsuccinic acid in the foregoing procedure.

I claim:

α-Methyl-α-phenyl-β-ethylsuccinimide.

References Cited in the file of this patent

UNITED STATES PATENTS 2,643,257    Miller et al. _____ June 23, 1953

OTHER REFERENCES

Miller et al.: J. Am. Chem. Society, vol. 73, pages 5608–5610 (1951), QD1 A5.